United States Patent [19]

Hart et al.

[11] Patent Number: 5,240,271
[45] Date of Patent: Aug. 31, 1993

[54] TRACTOR-MOUNTED INTEGRATED GLADHAND AND QUICK-RELEASE VALVE FOR TRACTOR-TRAILER HIGHWAY VEHICLES

[75] Inventors: James D. Hart, Ortonville; Leon R. Acre, Ovid, both of Mich.

[73] Assignee: Midland Brake, Inc., Kansas City, Mo.

[21] Appl. No.: 788,882

[22] Filed: Nov. 7, 1991

[51] Int. Cl.$^5$ ............................................. B60T 8/00
[52] U.S. Cl. ................................. 280/421; 137/102; 137/104; 285/69; 303/7
[58] Field of Search ............ 280/420, 421, 455.1; 303/7, 35; 137/102, 107; 285/68, 69

[56] References Cited

U.S. PATENT DOCUMENTS

| | | | |
|---|---|---|---|
| 2,922,662 | 1/1960 | Hall | 280/421 |
| 3,832,016 | 8/1974 | Pekrul | 303/7 |
| 4,733,919 | 3/1988 | Jacobs et al. | 303/7 |
| 4,878,513 | 11/1989 | Ashby et al. | 137/102 |

FOREIGN PATENT DOCUMENTS

| | | |
|---|---|---|
| 1225904 | 8/1987 | Canada . |
| 1505404 | 10/1969 | Fed. Rep. of Germany . |
| 2037008 | 1/1972 | Fed. Rep. of Germany . |
| 3939223 | 5/1990 | Fed. Rep. of Germany . |

Primary Examiner—Margaret A. Focarino
Assistant Examiner—A. M. Boehler
Attorney, Agent, or Firm—Leydig, Voit & Mayer, Ltd.

[57] ABSTRACT

An integrated gladhand and quick-release valve for tractor-trailer highway vehicles is mounted on the tractor, as opposed to the trailer, so the operator of a particular tractor will uniformly have quick-release capability for any trailer drawn by the truck. The integrated gladhand and quick-release valve provides an inlet port for fluid communication from the tractor brake system and an outlet port for fluid communication to the trailer brake system. The intermediate passageway that provides fluid communication between the inlet and outlet ports contains a valve element. The valve element may be apertured to allow limited, continuous fluid communication between the tractor and trailer brake lines. During the quick-release mode, the tractor side is substantially isolated and the trailer side is vented through an exhaust port. The present invention provides a uniform and safe braking system for tractor-trailer highway vehicles where the tractor operator does not own or maintain the trailers. The present invention provides an improved integrated gladhand and quick-release valve that reduces the response time of trailer brakes to application and release of the brake pedal and reduces hysteresis effects.

14 Claims, 4 Drawing Sheets

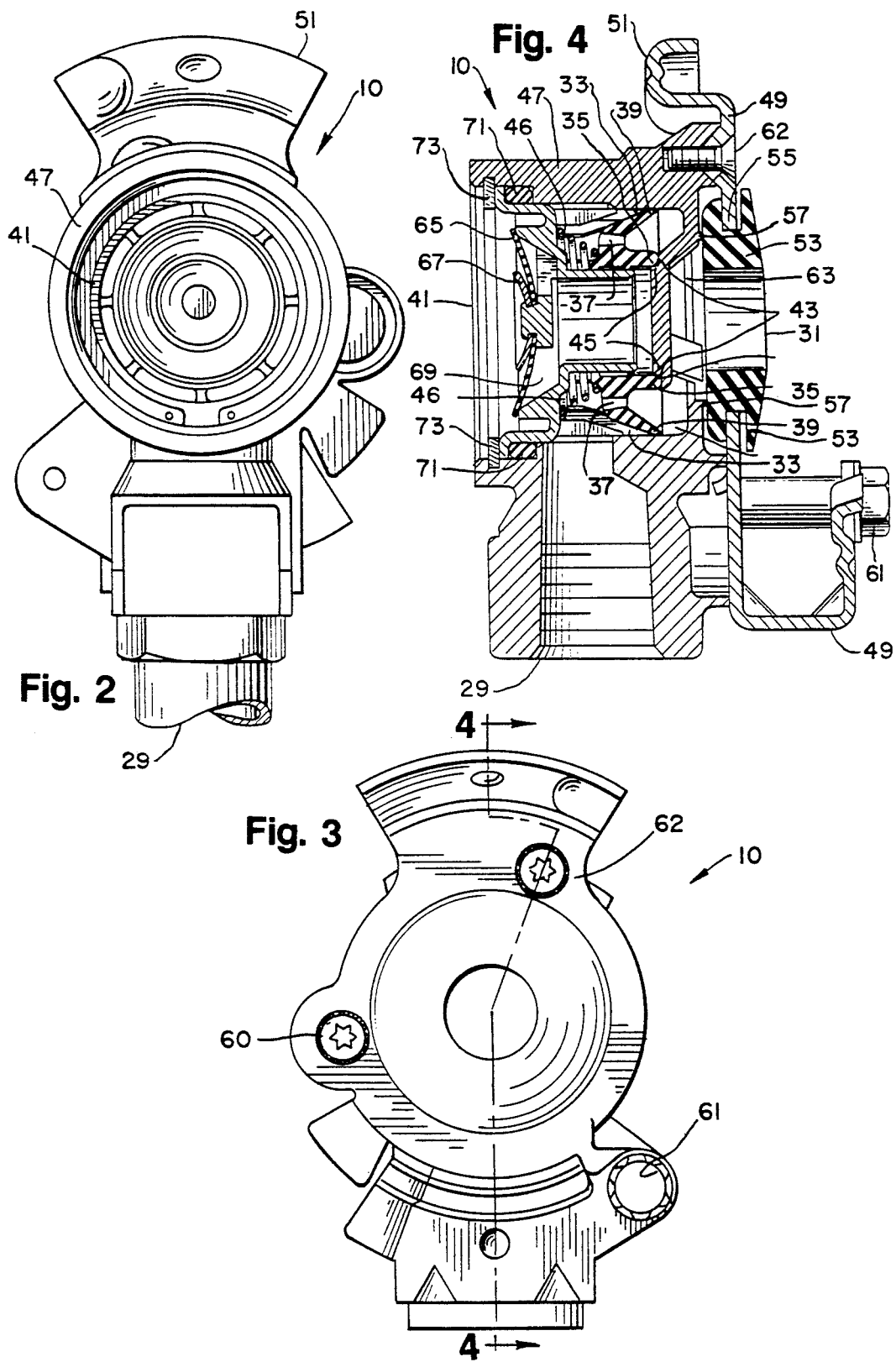

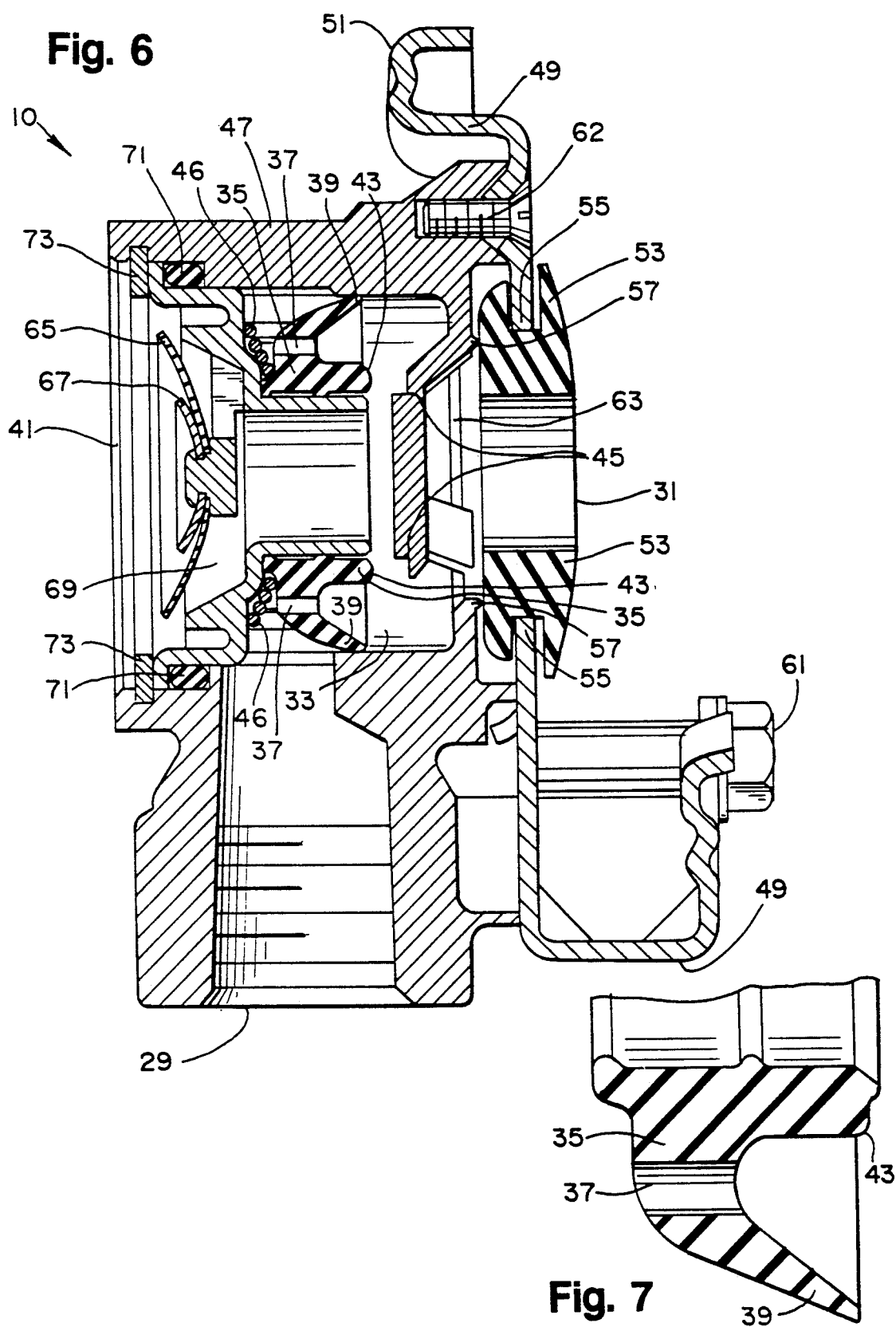

5,240,271

TRACTOR-MOUNTED INTEGRATED GLADHAND AND QUICK-RELEASE VALVE FOR TRACTOR-TRAILER HIGHWAY VEHICLES

FIELD OF THE INVENTION

The present invention relates to an integrated gladhand and quick-release valve for air brakes for tractor-trailer highway vehicles, particularly to such a device that is mounted on the tractor, as opposed to being mounted on the trailer.

BACKGROUND OF THE INVENTION

The trucking industry is an essential element in our interstate commerce system. Shipment of goods by tractor-trailer rig is an inexpensive way to distribute goods throughout the country. One drawback to this system is that these large and heavy vehicles share the open highways with the motoring public. Therefore, it is essential that tractor-trailer rigs be operated in a safe manner and have the best safety equipment available.

Many tractor-trailer rig drivers, particularly independent tractor-trailer operators, drive one particular tractor all the time. The trailers that they tow are normally owned, operated and maintained by separate entities. The independent tractor-trailer operator is hired to transport trailers from one location to another. The operator traverses the country, hauling one or more trailers from one location to the next, picking up a different trailer or trailers, and then moving on. Thus, more than one entity is responsible for the maintenance and safety equipment of a tractor-trailer rig on the highway. More important, the operator is intimately familiar with the characteristics and equipment of the tractor he drives, but not of the trailer he pulls with that tractor.

Quite possibly, the most important piece of safety equipment on a tractor-trailer rig is the brake system. In an emergency, the operator depends on the brake system to stop a tractor-trailer rig that can weigh 50,000 pounds or more. The brakes located on the tractor and on the trailers must work together to slow down a tractor-trailer rig.

An important device in any tractor-trailer brake system is the gladhand. A gladhand is the coupling between the tractor and trailer air brake lines. The gladhand communicates between the brakes located on the tractor and the brakes located on the trailer.

When the truck driver pushes down on the brake pedal in the tractor, the air pressure in the tractor brake line is increased rapidly to apply the brakes on the tractor. This air pressure is simultaneously transferred through the gladhand to apply the brakes on the trailer. When the operator releases the brake pedal, the brake system at the tractor has its own exhaust system to release air pressure. In the past, this exhaust has also provided the pressure release for the trailer brakes. However, the response time for the trailer brakes after the brake pedal was released was undesirably long. For some long rigs, the release time may be from one to one and one-half seconds.

This time delay causes serious safety concerns. Inexperienced drivers may accelerate before the brakes fully release. In other situations, the tractor-trailer rig will roll after the brake pedal is released. Both situations cause unnecessary wear to brake drums, shoes and tires. In a situation where the road surface is slick or icy, skidding or sliding is a hazard and can cause serious accidents.

A recent improvement in the standard gladhand has been the addition of a quick-release valve at the gladhand apparatus. The quick-release valve shortens the brake release time at the trailer. Thus, the overall safety of the tractor-trailer is enhanced.

The integration of a quick-release valve and a gladhand device is taught by Jacobs et al., U.S. Pat. No. 4,733,919 and by Berg and Skurka, Canadian Patent No. 1,225,904. Both references disclose gladhand devices with quick-release valves mounted on the trailer, as opposed to the tractor. Jacobs states that optimum results are obtained when the gladhand and quick-release valve is mounted at the forward end of the trailer and states that it is desirable to provide such a device at the forward end of the trailer. See, Jacobs Col. 2, lines 24–33; Col. 3, lines 53–55. The Berg reference also teaches a combination gladhand and quick-release valve mounted at the trailer or between two trailers.

A disadvantage of the teachings of Jacobs and Berg is the suggestion that the gladhand and quick-release valve is desirably mounted on the trailer, as opposed to the tractor, of a tractor-trailer rig. The driver is not assured that a particular trailer he is pulling at the moment is equipped with an integrated gladhand and quick-release valve. Even if the driver hooked up the gladhand, he may respond incorrectly in an emergency or forget whether the trailer he is currently pulling has a quick release valve.

Another phenomenon that contributes to the slow response of the trailer brakes to the release of the brake pedal is hysteresis. Hysteresis is a retardation or a lagging of the effect when the forces acting upon a body are changed. In the case of a tractor-trailer brake system, hysteresis refers to the slow response time of the tractor-trailer brakes when the operator releases the brake pedal. This hysteresis is caused by a pressure difference between the input and output lines of a combined gladhand and quick release valve before the brakes are applied or released.

SUMMARY OF THE INVENTION

An object of the invention is to provide a quick-release valve for tractor-trailer highway vehicles that is uniformly accessible to a particular driver in the event that quick-release valves are not universally installed on all trailer equipment.

Another object of the invention is to prevent the development of a pressure difference between the input and output ports of a quick release valve when the brakes are not being applied.

To achieve the foregoing and other objects in accordance with the purposes of the present invention, as embodied and broadly claimed herein, the integrated gladhand and quick-release valve for tractor-trailer highway vehicles is mounted on the tractor, specifically the end of the tractor service brake jumper hose for fluid communication between the tractor brake system and the trailer brake system. An intermediate passageway provides fluid communication between the inlet port and the outlet port. An exhaust port provides fluid communication between the trailer brake lines and the ambient atmosphere. The valve element in the passageway between the inlet and outlet ports provides controlled fluid communication between the inlet and outlet ports, and consequently, the tractor and trailer brake lines. When the flow rate through the inlet port (tractor) to the outlet port (trailer) exceeds a predetermined amount, the valve in the passageway opens, providing increased fluid communication between the inlet and outlet ports. A spring keeps the valve element in a closed position with respect to the exhaust port until the flow rate through outlet port to the inlet port exceeds a predetermined amount, or an amount sufficient to generate a pressure differential sufficient to compress the spring and establish fluid communication between the outlet port and the atmosphere. When the rate of flow through the outlet port to the inlet port does not exceed a predetermined amount or an amount sufficient to collapse the spring, the exhaust port is isolated from both inlet and outlet ports.

In the preferred embodiment, an aperture in the valve element provides continuous controlled fluid communication between the tractor and trailer brake lines. This aperture reduces the effect of hysteresis between the inlet and outlet ports. Continuous fluid communication between the inlet and outlet ports helps reduce the response time of the trailer brake system when reacting to changes in air pressure communicated from the tractor brake system.

BRIEF DESCRIPTION OF THE DRAWINGS

FIG. 2 is a front elevation of a gladhand in accordance with the present invention.

FIG. 3 is a rear elevation of the embodiment of FIG. 2.

FIG. 4 is a section of the connector taken along line 4—4 of FIG. 3. The valve element between the inlet and outlet ports is in the closed position restricting communication between the inlet and outlet ports. The exhaust port is isolated.

FIG. 6 is a view similar to FIGS. 4 and 5. The valve element between the inlet and outlet ports is closed. The valve element is in the quick-release position providing communication between the exhaust and outlet ports.

FIG. 7 is an enlarged, fragmentary section of the valve element and its small aperture as shown in FIGS. 4, 5, and 6.

DETAILED DESCRIPTION OF THE DRAWINGS

While the invention will be described in connection with certain preferred embodiments, it will be understood that the invention is not limited to those embodiments. On the contrary, the invention comprehends all alternatives, modifications and equivalents that may be included within the scope of the invention as defined by the appended claims.

Figure 1:
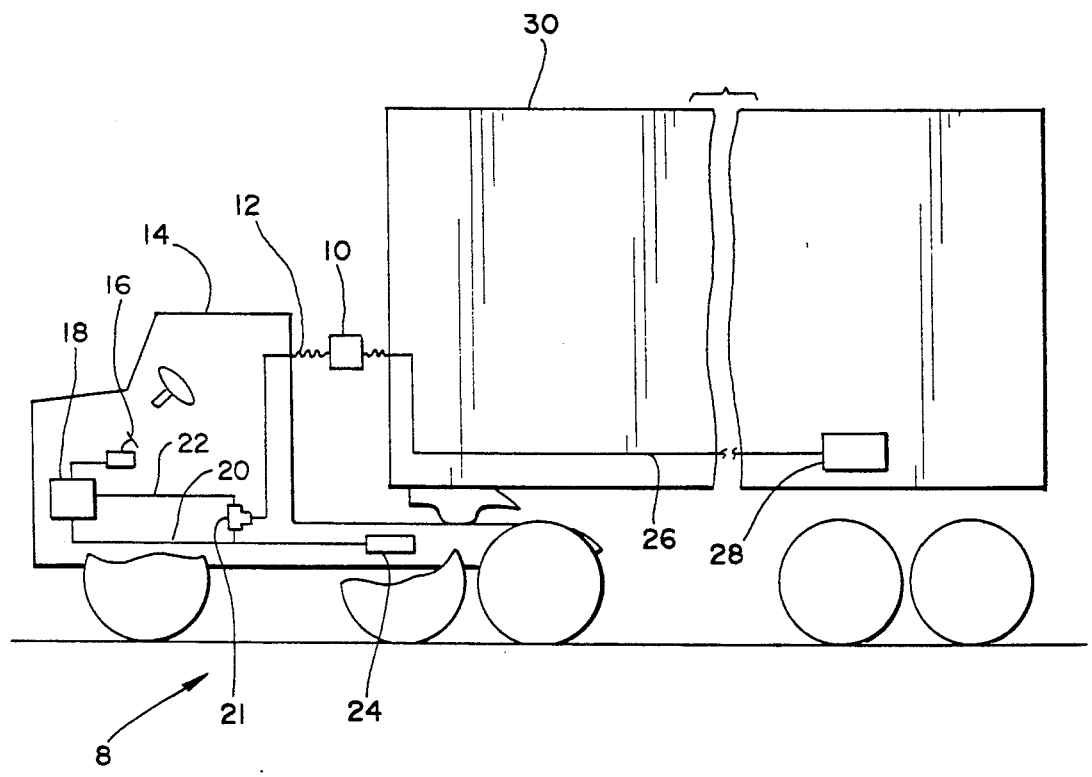
FIG. 1 is a schematic side elevation of a tractor-trailer rig and brake system.

FIG. 1 shows one location of the present invention on a tractor-trailer rig, generally indicated as 8. An integrated gladhand and quick release valve 10 may be connected to the end of the air hose 12 which is permanently attached to a tractor 14. Because the air hose 12 is permanently attached to the tractor 14, the integrated gladhand and quick release valve 10 remains mounted to and associated with the tractor 14. In alternative embodiments, the present invention should be mounted in a readily accessible location, preferably at the rear of the cab. Alternative locations include, but are not limited to the engine compartment or under the passenger seat.

When the truck driver depresses the brake pedal 16, the tractor brake system 18 increases the air pressure in the brake lines 20 and 22. The increased air pressure in the brake line 20 results in the tractor brake 24 being applied. When the brake pedal 16 is released, the excess air pressure in the brake line 20 is vented through the brake system 18, releasing the tractor brake 24.

Similarly, when the brake pedal 16 is applied, increased air pressure passes through the brake line 22, the two-way check-valve 21, the air hose 12, the integrated gladhand and quick release valve 10, and the brake line 26 to the trailer brake 28. When the brake pedal 16 is released, the excess air pressure in the brake line 22 is vented through the tractor brake system 18. Furthermore, the excess air pressure in the brake line 26 is vented through the quick release mechanism of the integrated gladhand and quick release valve 10. This action enables the tractor brakes to be released more quickly than if the excess air pressure in the brake line 26 needed to be vented through the tractor brake system 18.

The integrated gladhand and quick release valve 10 is to be mounted on the end of the air hose 12, at the rear of the tractor cab, in the engine compartment or inside the tractor cab. In any case, the integrated gladhand and quick release valve 10 is mounted, either directly or indirectly, on the tractor 14 as opposed to being mounted on the trailer 30.

The details of the integrated gladhand and quick release valve 10 are disclosed in FIGS. 2-7. Turning first to FIGS. 1-4, increased air pressure, communicated from the tractor brake system 18 after the operator depresses the brake pedal 16, enters the gladhand and quick release valve apparatus 10 through an inlet port 29. When the brakes are being applied, air or fluid travels through the inlet port 29 and through an outlet port 31, en-route to the trailer brake system 28. An intermediate passageway 33 provides fluid communication between the inlet port 29 and the outlet port 31. A valve element 35 controls most of the flow of air or fluid between the inlet port 29 and the outlet port 31. The valve element 35 is in the closed and normal position in FIG. 4. An aperture 37 (shown in detail in FIG. 7) allows continuous fluid communication between the inlet port 29 and the outlet port 31. The aperture 37 is small enough that the pressures in the inlet port 29 and the outlet port 31 will equalize slowly, eliminating the residual pressure difference and hysteresis. The rate of equalization should be much slower than the rate of transfer of air when the valve element 35 is open.

However, the aperture 37 varies in cross-sectional area depending upon the pressure differential and rate of flow between the inlet port 29 and the outlet port 31. As the rate of flow from the inlet port 29 to the outlet port 31 increases, the cross-sectional area of the aperture 37 decreases to make the valve element 35 more sensitive to opening and thereby increasing fluid communication between the inlet port 29 and the outlet port 31 when the brake pedal 16 is applied by the driver. Also, when the rate of flow from the outlet port 31 to the inlet port 29 increases, the cross-sectional area of the aperture 37 decreases to make the valve element 35 more sensitive to opening the passageway between the outlet port 31 and the exhaust port 41, thus quickly releasing the pressure in the brake line 26.

The cross-sectional area of the aperture 37 varies as a result of increased rate of flow in either direction. The valve element 35 is made of rubber or an alternative elastomeric material When the flow rate through the aperture 37 is increased, the resulting pressure drop within the aperture constricts the walls of the aperture, thus reducing its diameter, thus increasing its resistances to flow. As a result, a back pressure is generated at the flow side of the valve 35. The valve 35 is prevented from expanding outward by the valve body 47.

Figure 5:
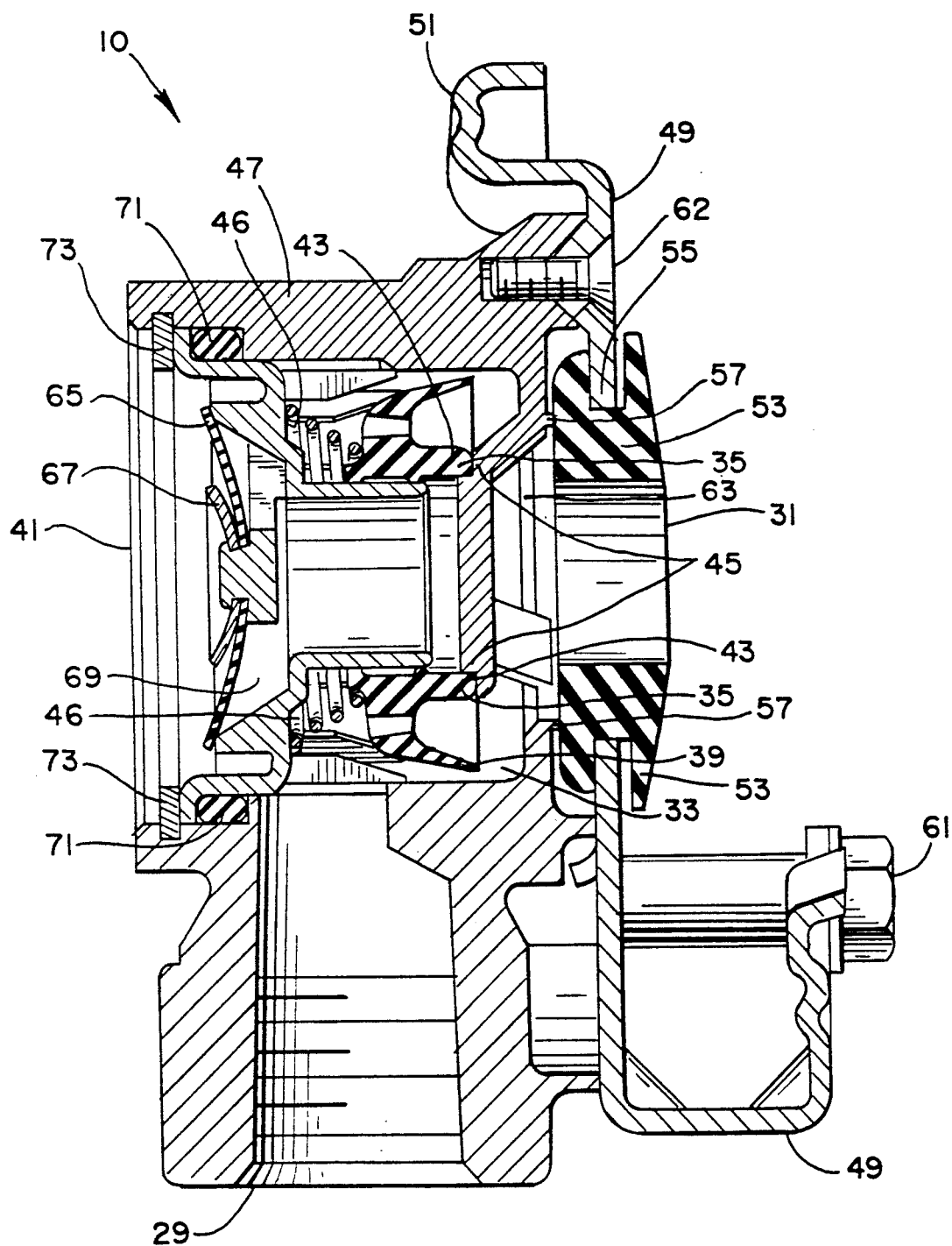
FIG. 5 is a view similar to FIG. 4 where the valve element between the inlet and outlet ports is in the open position providing increased communication between the inlet and outlet ports. The exhaust port is isolated.

When the pressure in the inlet port 29 exceeds the pressure in the outlet port 31 by a predetermined amount, the annular flange 39 of the valve element 35 shifts to the open position as shown in FIG. 5, providing increased communication between the inlet port 29 and the outlet port 31. However, when the pressure in the inlet port 29 is greater than the pressure in the outlet port 31 by less than the predetermined amount, or is less than the pressure in the outlet port 31, the flange 39 is closed, as seen in FIG. 4.

An exhaust port 41 is shown in FIGS. 2 and 4–6. The exhaust port 41, as shown in FIG. 4, is isolated with respect to both the inlet port 29 and the outlet port 31. The apparatus as shown in FIG. 4 is in the standby position. The brakes are not being applied, nor is any excess air pressure being vented through the exhaust port 41. The valve element 35 has an inner flange 43 around its inner periphery. When the inner flange 43 abuts against the seat 45, the exhaust port 41 is isolated.

Turning now to FIG. 6, the inner flange 43 is not in abutting engagement with the seat 45. FIG. 6 shows what happens when the flow through the outlet port 31 exceeds the flow through the inlet port 29 by a predetermined amount. This action occurs when the brake pedal 16 is released by the operator. Excess air pressure on the tractor side is vented through the tractor brake system 18, dropping the pressure at the inlet port 29. At this moment, excess air pressure at the outlet port 31 results in increased flow through the outlet port 31 towards inlet port 29 which decreases the cross-sectional area of the aperture 37. The result is that the valve element 35 is pushed against the spring 46. When the spring 46 is collapsed, the inner flange 43 is not abutting the seat 45 and fluid communication exists between the outlet port 31 and the exhaust port 41. Excess air pressure in the trailer brake line 26 is vented through the exhaust port 41.

Thus, pressure balance is achieved at slow to moderate rates of operation by air simply moving through the aperture 37. As the air flow rate increases, as it would during fast brake application and/or release, the aperture 37 constricts so that the valve element 35 is more sensitive to either opening for brake application or switching to the exhaust position when the brake pedal is released.

Turning back now to FIG. 5 for a detailed description of the preferred embodiment of the present invention, the body 47 of the apparatus is made of die cast aluminum or cast steel. The mounting bracket 49 and accompanying apparatus is designed to mate with a conventional gladhand conforming to SAE Standard J318. The steel shoe 51 substantially conforms to the surface of a wing on a standard gladhand conforming to SAE standard J318. The inner portion of the steel shoe 51 provides a locking surface for the conventional gladhand connector coming from the trailer. The outlet port 31 is surrounded by an elastomeric face 53. The elastomeric face 53 is held in place by an inwardly directed flange 55 and an outwardly directed flange 57. The inwardly directed flange 57 is a part of the mounting bracket 49 and is held in place by a screw 60, a bolt 61 and a screw 62. The elastomeric face 53 covers the multiple aperture opening 63. The exhaust outlet 41 is protected against clogging and damage by the elastomeric flap 65 and the curved disc 67. The elastomeric flap 65 and the curved disc 67 and the multiple apertured opening 69 comprise what is commonly known as a flapper valve. Moisture and debris are prevented from entering the apparatus around the flapper valve by an O-ring 71. The entire flapper valve apparatus is held in place by a snap ring 73. At the bottom of FIG. 6, the inlet port 29 is threaded to mate with the brake line 22 or the air hose 12 coming from the tractor 14. The valve element 35 is made of an elastomeric material similar to that of the elastomeric face 53.

The integrated gladhand and quick-release valve 10 may be mounted directly on the free end of the air hose 12 as shown in FIG. 1. In alternative embodiments, specifically where the tractor is already equipped with a conventional tractor protection valve, the device may be mounted at the rear of the tractor cab, in the engine compartment, or inside the cab depending on the location of the conventional tractor protection valve. It is important that the gladhand and quick-release valve 10 be located at a readily accessible location. Also, a second integrated gladhand and quick-release valve may be mounted at the rear of the first towed trailer and between the second towed trailer to enhance the brake release on the second towed trailer. In any case, the driver is assured that his or her tractor is equipped with the device and no adjustment in brake operation need be made for different trailers. The gladhand and quick-release valve 10 can also be divided into two separate elements, mounted in different locations, providing the quick-release valve is secured to the tractor.

The integrated gladhand and quick-release valve 10 may be modified to provide communication between a tractor and a plurality of trailers. An outlet port 31 is connected to a trailer brake line 26 which feeds into a separate brake line for each trailer. Thus, one integrated gladhand and quick-release valve 10 provides communication through a single brake line 26 to one or more trailers.

A gladhand that is presently employed on the front of the trailer can be removed and replaced by a hose fitting. Alternatively, the trailer brake coupling equipment could be used, and the quick-release valve could be installed in the line 22 near its aft end.

The present invention not only adds a quick-release exhaust valve to the brake system, but also puts it in a location where it is most effective. Locating the gladhand and quick-release valve at the extreme aft end the air hose associated with the tractor is most effective for the tractor operator because he or she knows its location and can easily maintain it and ensure that it is working properly. Locating the present invention at the end of the air hose associated with the tractor will also make retrofitting existing tractors easier.

What is claimed is:

1. A tractor-trailer rig comprising a tractor brake system, a trailer brake system, and an integrated gladhand and quick-release valve for coupling said tractor brake system and said trailer brake system, said valve comprising:

a. an inlet port for fluid communication from the tractor brake system;

b. an outlet port for fluid communication to the trailer brake system;
c. an intermediate passageway providing fluid communication between said inlet port and said outlet port;
d. an exhaust port providing fluid communication between said outlet port and the atmosphere; and
e. a valve element in said passageway for controlling fluid communication between said inlet port, said outlet port and said exhaust port; wherein:
f. said valve element allows fluid communication between said inlet port and said outlet port when the fluid pressure at said inlet port exceeds that at said outlet port by a first predetermined amount;
g. said valve element substantially isolates said exhaust port from said passageway, said inlet port and said outlet port when the fluid pressure at said outlet port is less than a second predetermined amount above the pressure at said inlet port;
h. said valve element provides fluid communication between said outlet port and said exhaust port when the pressure at said outlet port exceeds the pressure at said inlet port by at least said second predetermined amount, whereby the pressure at said outlet port is exhausted to the atmosphere; and
i. said valve element includes means for providing a controlled continuous fluid communication to slowly equalize the pressure between said inlet port and said outlet port; said means for providing a controlled continuous fluid communication comprising an aperture in said valve element communicating between said inlet port and said outlet port.

2. The tractor-trailer rig of claim 1, wherein said second predetermined amount is determined by bias imposed on said valve element by a spring.

3. The tractor-trailer rig of claim 1, wherein said valve is tractor mounted and has a gladhand seal positioned at said outlet port for mating with a gladhand seal of a complementary gladhand connector on the trailer to establish fluid communication with the trailer brake system.

4. The tractor-trailer rig of claim 1, wherein said exhaust port has a flapper valve to isolate and protect the port from surrounding ambient conditions.

5. The tractor-trailer rig of claim 1, wherein said valve element comprises a slidable, generally annular elastomeric seal which is spring biased in a first position isolating said passageway from said exhaust port, said seal being slidable against the spring bias to a second position to provide fluid communication between said exhaust port and said outlet port.

6. The tractor-trailer rig of claim 1, wherein the fluid flow rate through said aperture from said inlet port to said outlet port defines a pressure differential, and the cross-sectional area of said aperture decreases when said fluid flow rate increases.

7. The tractor-trailer rig of claim 1, wherein the fluid flow rate through said aperture from said outlet port to said inlet port defines a pressure differential, and the cross-sectional area of said aperture decreases when said fluid flow rate increases.

8. An integrated gladhand and quick-release valve for coupling a tractor brake system and a trailer brake system of a tractor-trailer rig, said valve comprising:

a. an inlet port for fluid communication with the tractor brake system;
b. an outlet port for fluid communication with the trailer brake system;
c. an intermediate passageway providing internal fluid communication between said inlet port and said outlet port;
d. an exhaust port providing fluid communication between said outlet port and the atmosphere; and
e. a valve element in said passageway for controlling fluid communication between said inlet port, said outlet port and said exhaust port; wherein:
f. said valve element allows fluid communication between said inlet port and said outlet port when the fluid pressure at said inlet port exceeds that at said outlet port by a first predetermined amount;
g. said valve element substantially isolates said exhaust port from said passageway, said inlet port and said outlet port when the fluid pressure at said outlet port is less than a second predetermined amount above the pressure at said inlet port;
h. said valve element provides fluid communication between said outlet port and said exhaust port when the pressure at said outlet port exceeds the pressure at said inlet port by at least said second predetermined amount, whereby the pressure at said outlet port is exhausted to the atmosphere; and
i. said valve element includes means for providing a controlled continuous fluid communication to slowly equalize the pressure between said inlet port and said outlet port; said means for providing a controlled continuous fluid communication comprising an aperture in said valve element communicating between said inlet port and said outlet port.

9. The integrated gladhand and quick release valve of claim 8 including a gladhand seal positioned at said outlet port for mating with a gladhand seal of a complementary gladhand connector.

10. The integrated gladhand and quick release valve of claim 8, wherein said second predetermined amount is determined by bias imposed on said valve element by a spring.

11. The integrated gladhand and quick release valve of claim 8, wherein said exhaust port has a flapper valve to isolate and protect the port from surrounding ambient conditions.

12. The integrated gladhand and quick release valve of claim 8, wherein said valve element comprises a slidable, generally annular elastomeric seal which is spring biased in a first position isolating said passageway from said exhaust port, said seal being slidable against the spring bias to a second position to provide fluid communication between said exhaust port and said outlet port.

13. The integrated gladhand and quick release valve of claim 8, wherein the fluid flow rate through said aperture from said inlet port to said outlet port defines a pressure differential, and the cross-sectional area of said aperture decreases when said fluid flow rate increases.

14. The integrated gladhand and quick release valve of claim 8, wherein the fluid flow rate through said aperture from said outlet port to said inlet port defines a pressure differential, and the cross-sectional area of said aperture decreases when said fluid flow rate increases.

* * * * *